United States Patent [19]

Baer

[11] 4,175,391
[45] Nov. 27, 1979

[54] SELF REORIENTING SOLAR TRACKER

[75] Inventor: Stephen Baer, Corrales, N. Mex.

[73] Assignee: Dow Corning Corporation, Midland, Mich.

[21] Appl. No.: 859,624

[22] Filed: Dec. 12, 1977

[51] Int. Cl.² ............................ F03G 7/02; F03G 7/06
[52] U.S. Cl. .......................................... 60/531; 60/675; 126/424; 60/641
[58] Field of Search ................ 60/531, 641, 675, 641; 126/270, 271

[56] References Cited

U.S. PATENT DOCUMENTS 2,187,124   1/1940   Harmon ............................ 60/531 X
2,999,943   9/1961   Geer ................................. 60/641 X
4,079,249   3/1978   Glynn ............................... 60/641 X Primary Examiner—Allen M. Ostrager
Attorney, Agent, or Firm—Howard W. Hermann

[57] ABSTRACT

Apparatus for causing a solar energy collector to constantly follow the sun by using solar radiant energy to differentially heat fluid-containing reservoirs to cause differential vaporization and shifting of fluid to rotate the apparatus. Automatic morning orientation is included by providing the easterly reservoir with a faster rate of cooling than the westerly one thereby causing shift of fluid from westerly to easterly after sunset resulting in inclination toward the east by sunrise.

4 Claims, 7 Drawing Figures

SELF REORIENTING SOLAR TRACKER

BACKGROUND OF THE INVENTION

The present invention relates to solar tracking devices designed for maintaining a solar energy collecting device in optimum position with respect to the sun.

Solar energy collectors such as thermal collection devices and solar cells for conversion of solar radiation to electrical energy operate most efficiently when aimed directly at the sun. For this reason numerous types of tracking devices have been developed to follow the sun from east to west each day and adjust also for seasonal changes in the sun's position. While many systems utilize clockwork motors and similar mechanically powered elements, one very simple type of system requiring no external power input is disclosed in U.S. Pat. No. 2,999,943 granted Sept. 12, 1961 to C. W. Geer. In this device a pair of closed containers interconnected in fluid communication are mounted on opposite sides of a pivot axis. The containers are partially filled with a low boiling point fluid and sun shielding means are positioned relative to the containers so that equal solar radiation reaches the containers only when the device is aimed directly at the sun. Otherwise one container receives more radiation than the other causing differential evaporation of the fluid and forcing fluid to the opposite container due to pressure differentials. The weight of the excess fluid on one side causes tipping until the device is aimed toward the sun. While the Geer patent does not specifically disclose it the system must maintain its center of gravity below the pivot axis to prevent tipping completely as soon as one container contains more liquid than the other.

The device of the Geer patent, however, follows the sun from east to west and then remains oriented overnight with the device aimed at the west. It must be either manually reset to the easterly direction during the night or await rising of the sun sufficiently high above the horizon in the morning so that the sun's rays reach over the high eastern shield and reach the western container to start causing vaporization. A substantial portion of morning sunlight therefore is lost before orientation is achieved.

SUMMARY OF THE INVENTION

Accordingly it is an object of the present invention to provide automatic nighttime resetting of a sun tracker of the type shown in the aforementioned Geer patent.

Briefly, this and other objects are accomplished in their broadest sense by providing the two containers of low boiling point liquid with differential cooling rates. When the sun sets, the air cools and the evaporated fluid in the containers condenses. By regulating rates of cooling such that the easterly container cools faster than the westerly container, fluid transfers from the westerly container because of the higher pressure of the vaporized liquid in that container. The transfer of fluid to the easterly container causes it to become heavier and tips the array to the east to await the rising sun.

The cooling rate differential can be achieved by simple expedients including making use of thermal emissivity, conduction, convection, and/or differential sizes and/or surface areas. In its simplest form it can be accomplished by providing portions of the westerly container with a paint having low thermal emissivity, while the remaining portions of the two containers are provided with a higher emissivity paint, or by providing thermal insulation over a portion of the surface of only the westerly container so that heat dissipates faster from the easterly container. The system is extremely simple, but effective, and requires no outside energy source to operate. It increases efficiency greatly.

DESCRIPTION OF PREFERRED EMBODIMENTS

Figure 1:
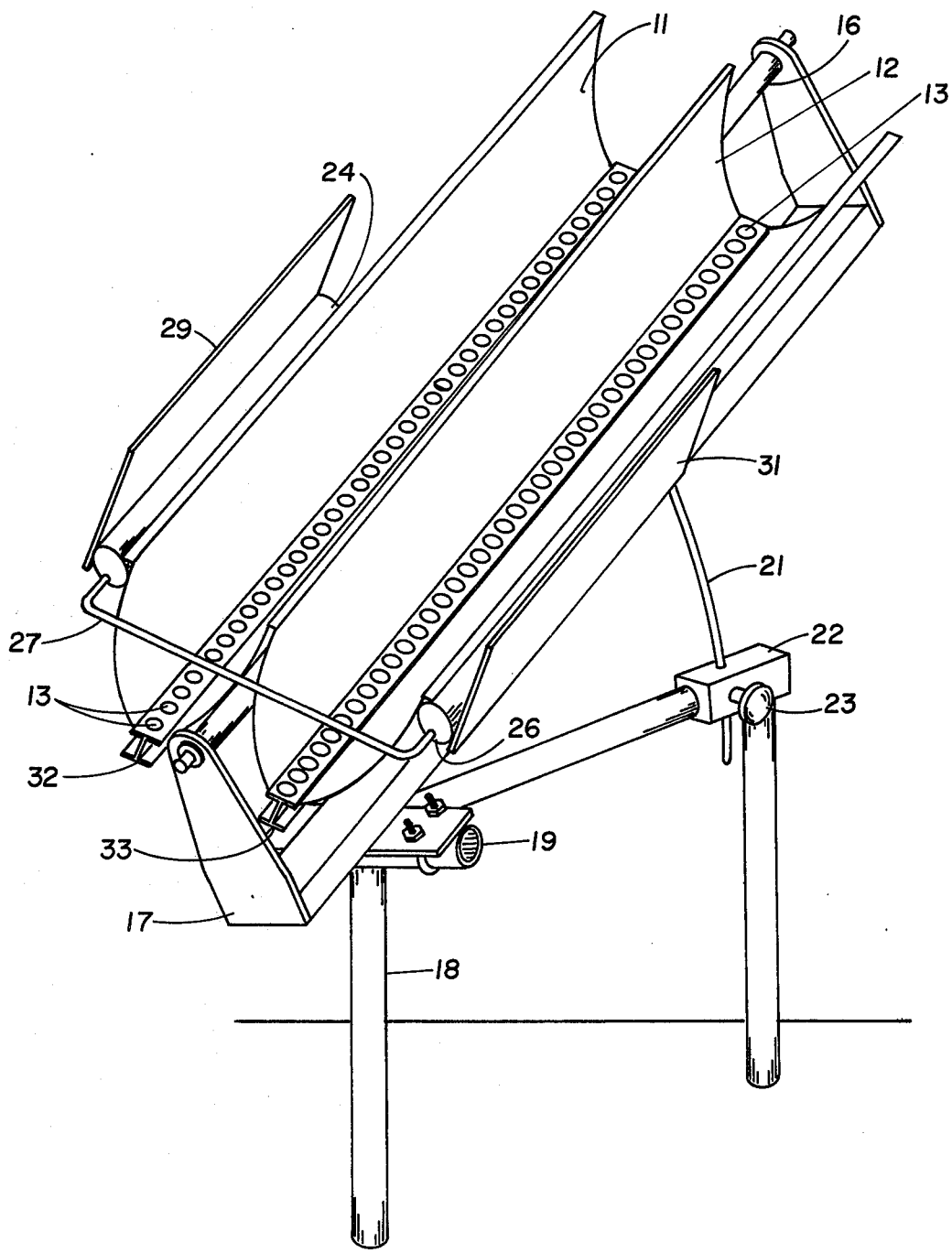
FIG. 1 is a view in perspective of a solar collector and tracker embodying the present invention.

Referring now to the drawings wherein like reference characters designate like or corresponding parts throughout the figures thereof there are shown embodiments of the invention which will enable those skilled in the art to understand same and appreciate the attendant advantages thereof. FIG. 1 illustrates a photovoltaic solar energy collector utilizing a sun tracker of the type with which the present invention is concerned.

The solar energy collector shown in FIG. 1 comprises a pair 11, 12 of parabolic reflectors each having an array of solar cells 13 mounted therein for collecting solar radiation and directly generating electric power therefrom. The reflectors and solar cells form no part of the present invention, and are shown only to illustrate application of the present invention. The invention can as well be applied to heat absorbing collectors and design of the collectors is generally immaterial. Those skilled in the art are well aware of numerous embodiments of such devices.

The collector array is mounted for pivotal action on a rod or axle 16 supported by a suitable bracket 17. The bracket 17 is in turn mounted on a support 18 which may be made adjustable to compensate for seasonal changes in the height of the sun above the horizon; although in many latitudes such provision is unnecessary. The support 18 shown includes a pivot rod 19 about which the bracket 17 can be rotated, and a curved rod 21 spaced from the pivot rod 19 which is affixed at its upper end to the bracket 17 and slideable through a block 22 which has a thumbscrew 23 associated therewith for locking the curved rod at the desired height. In the northern hemisphere the curved rod is to be placed at the northern end of the device and the pivot rod at the southern end. Obviously, in the southern hemisphere these positions must be reversed.

The tracker of the embodiment shown is designed to pivot the collector around the rod 16 in the east-west direction to follow the sun each day. The tracker comprises a pair of containers 24, 26 which in the embodiment illustrated are cylindrical but need not be. The containers are interconnected in fluid communication with a tube 27 and are partially filled with a low boiling point liquid such as dichlorodifluoromethane which is sold as Freon ® 12 by the DuPont Company. The containers and interconnecting tube are closed to the atmosphere and operate under pressure at operating temperatures. A pair of sun shields 29, 31 are provided to shade the east side of the easterly container 24 and the west side of the westerly container 26, respectively, unless the device is aimed directly at the sun, in which case no shadows will exist. In the embodiment shown, a pair of counterweights in the form of I-beams 32, 33 are fixed to the bottom of the collector, below the rotational axis formed by the rod 16 to lower the center of gravity of the system and maintain it below the rotational axis to prevent complete tipping as soon as the device becomes unbalanced.

Figure 2:
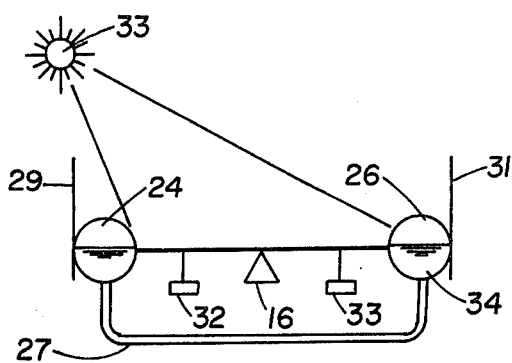
FIG. 2 is a diagrammatic view of a solar tracker illustrating the operational principles of the tracker of the embodiment of FIG. 1.
Figure 3:
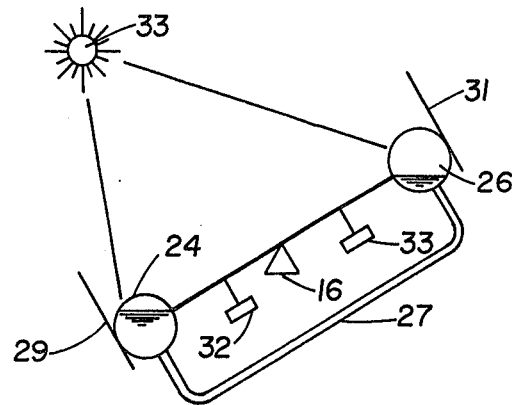
FIG. 3 is a diagrammatic view similar to FIG. 2 but showing the tracker in aimed position.

Operation of the tracker will be seen from the diagrammatic illustrations of FIGS. 2 and 3. In FIG. 2, the device comprising containers 24, 26 and associated shields 29, 31 is not aimed at the sun 33. The shield 29 casts a shadow and prevents a portion of the solar radiation from reaching the container 24; however the opposite container 26 is exposed to full radiation. This results in differential heating with the container 26 absorbing more heat, evaporating more of the liquid 34 contained therein, causing increased pressure in the bubble above the liquid and forcing liquid to the container 24 through the tube 27. This causes the container 24 to become heavier than the container 26 resulting in tipping toward the sun around the pivot 16. The counterweights 32, 33 prevent instability of the system. The system rotates until as shown in FIG. 3 both containers are heated evenly by exposure to the sun's rays. At this point pressure in the containers is equalized and no transfer of liquid occurs. The system thus tracks the sun from east to west and remains in the westerly position at sundown.

Thus far the embodiment described, while including some original design modifications, is based wholly on prior art knowledge. However, the device as described so far would not face the rising sun in the morning and therefore the solar collector would not get the benefit of several hours of morning sunlight.

Figure 4:
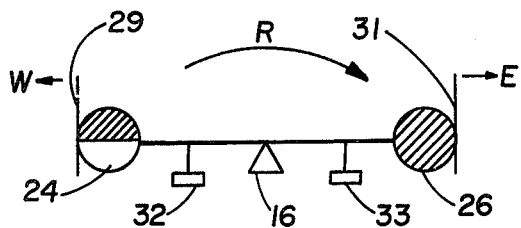
FIG. 4 is a diagrammatic view showing function of the reorientation improvement in one embodiment of the present invention.

As shown in the diagram of FIG. 4 the improvement of the present invention provides automatic reorientation after sundown. This is accomplished by providing the container 24 designed to be placed in the westerly position as indicated by the arrow W with means to limit cooling of the westerly container. By allowing the container 26 in the easterly position, as shown by the arrow E, to cool faster than the westerly container 24 the pressure in the cooler container; i.e., container 26, reduces faster than the pressure in the warmer container, and the differential pushes liquid from the warmer container to the cooler; i.e., from westerly container 24 to easterly container 26, causing the system to rotate about pivot axis 16 in the direction of the arrow R.

In the embodiment illustrated by FIG. 4 the differential cooling is accomplished by painting a portion of the westerly container 24 with a low emissivity coating such as one containing aluminum while the remainder of container 24 and all of easterly container 26 are painted with a higher emissivity paint such as a flat black. Since the high emissivity paint radiates heat faster than the other, the easterly container cools faster than the westerly one.

Figure 5:
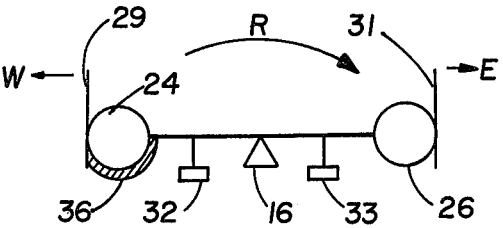
FIG. 5 is a diagrammatic view similar to FIG. 4 but showing a different embodiment of the reorientation improvement of the present invention.
Figure 6:
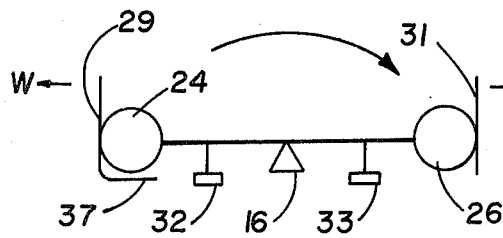
FIG. 6 is a diagrammatic view similar to FIGS. 4 and 5 but showing a further different embodiment of the reorientation improvement of the present invention.
Figure 7:
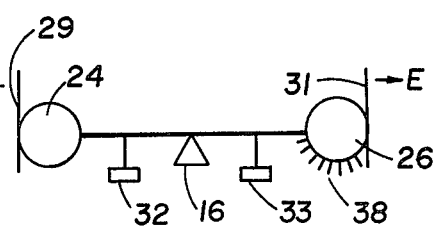
FIG. 7 is a diagrammatic view similar to FIGS. 4, 5, and 6 but showing still another embodiment of the reorientation improvement of the present invention.

In FIG. 5 a similar result is accomplished by providing thermal insulation 36 over a portion of the westerly container 24 and no thermal insulation over the easterly container 26. Similarly in FIG. 6 a reflector 37 is positioned adjacent the westerly container to limit heat dissipation. In FIG. 7 the same result is accomplished by providing heat radiating fins on the easterly container to cause it to dissipate heat rapidly. The structures designed for altering normal cooling should be placed in positions where they do not affect absorption of solar radiation during the daytime hours to prevent as much as possible unequal heating during the day when the device is aimed at the sun.

Other means of providing differential cooling can also be used and will be apparent to those skilled in the art from a consideration of the foregoing. Such differential cooling can make use of differential emission, conduction, convection, size, or thermal mass, without departing from the spirit of the invention. Besides the above described paints, insulation, properly positioned fins, and heat reflectors, size variations, and shapes can also be used singly or in combination with other devices to accomplish the differential cooling. Therefore it is to be understood that the invention may be practiced otherwise than as specifically described.

That which is claimed is:

1. In a solar tracking device comprising a pair of closed containers interconnected in fluid communication and mounted on opposite sides of a pivot axis and containing liquid having a low boiling point, said containers having sun shielding means positioned relative thereto to provide unequal solar radiation on the containers whenever the device is not aimed at the sun thereby causing greater vaporization of said liquid in one container which in turn causes transfer of liquid from that container to the other and rotation of the containers about the pivot until equal radiation is received by both containers, and means for maintaining center of gravity below the pivot axis to control motion around said pivot axis, the improvement which comprises:

differential cooling means for providing greater rate of heat dissipation from one container than that of the other, whereby the container with high heat dissipation can be placed in the easterly position and therefore will cool faster after sunset thereby causing transfer of liquid from the westerly container and automatic reorientation of the containers in preparation for sunrise.

2. The improvement defined in claim 1 wherein a portion of the container designed to be placed in the westerly position is provided with a coating which has a lower thermal emissivity than the surface of the container designed to be placed in the easterly position.

3. The improvement defined in claim 2 wherein the coating having lower thermal emissivity contains aluminum.

4. The improvement defined in claim 1 wherein the emissivity governing means includes thermal insulation over portions of the container designed to be placed in the westerly position.

* * * * *